June 2, 1970

L. HIDASSY 3,515,178

AUTOMATIC BUNDLING STRAP INSTALLING TOOL

Filed Feb. 13, 1968

INVENTOR.
LASZLO HIDASSY
BY

ATTORNEY

June 2, 1970  L. HIDASSY  3,515,178
AUTOMATIC BUNDLING STRAP INSTALLING TOOL
Filed Feb. 13, 1968  7 Sheets-Sheet 2

INVENTOR.
LASZLO HIDASSY
BY David Teschne
ATTORNEY

June 2, 1970          L. HIDASSY          3,515,178
AUTOMATIC BUNDLING STRAP INSTALLING TOOL
Filed Feb. 13, 1968          7 Sheets-Sheet 3

INVENTOR.
LASZLO HIDASSY
BY
ATTORNEY

June 2, 1970 L. HIDASSY 3,515,178
AUTOMATIC BUNDLING STRAP INSTALLING TOOL
Filed Feb. 13, 1968 7 Sheets-Sheet 5

INVENTOR.
LASZLO HIDASSY

ATTORNEY

June 2, 1970     L. HIDASSY     3,515,178
AUTOMATIC BUNDLING STRAP INSTALLING TOOL
Filed Feb. 13, 1968     7 Sheets-Sheet 6
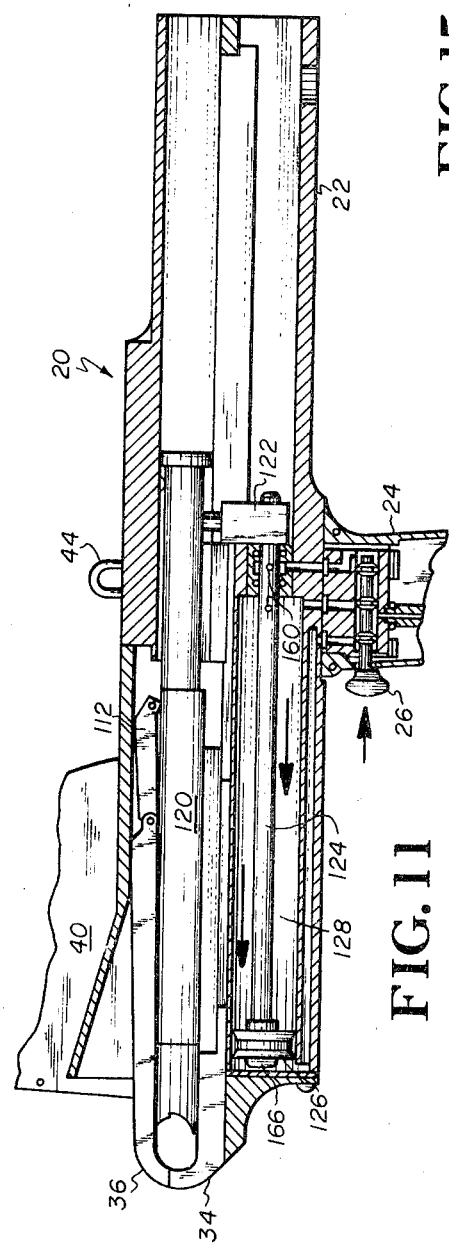
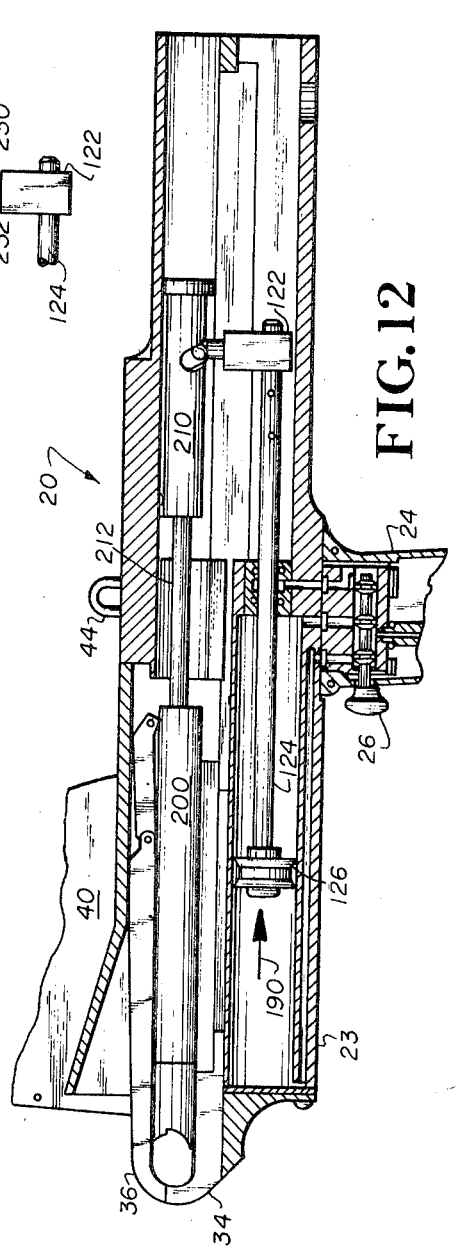
INVENTOR.
LASZLO HIDASSY
BY *David Teseline*
ATTORNEY

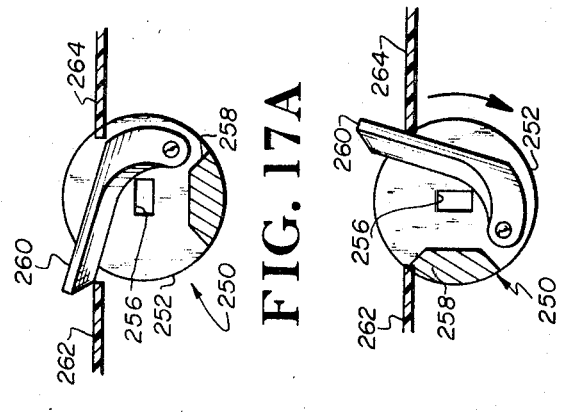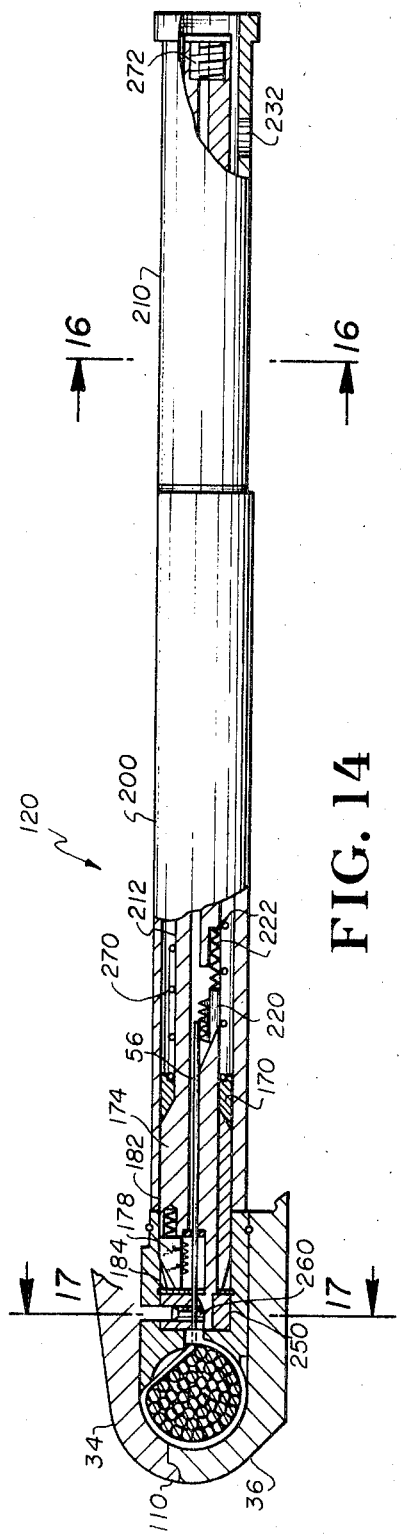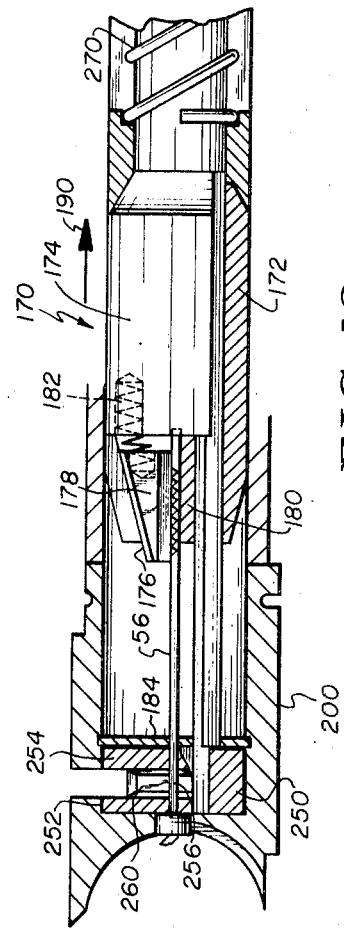

United States Patent Office 3,515,178
Patented June 2, 1970

3,515,178
AUTOMATIC BUNDLING STRAP INSTALLING TOOL
Laszlo Hidassy, Elizabeth, N.J., assignor to Thomas & Betts Corporation, Elizabeth, N.J., a corporation of New Jersey
Filed Feb. 13, 1968, Ser. No. 705,046
Int. Cl. B21f 9/00, 21/00
U.S. Cl. 140—123.6         21 Claims

ABSTRACT OF THE DISCLOSURE

The invention is directed to an automatic, cartridge loaded, fluid operated bundling strap installing tool. The tool consists of a housing containing the main tool elements, a fluid control unit mounted in a tool handle and a set of selectively operable jaws. With the jaws in the open position, they may be placed about a plurality of objects to be bundled, while in their closed position the jaws form the guides for looping a bundling strap about a plurality of articles to be bundled. Bundling straps, of the twist to lock type, are fed from a radial cartridge and position in the path of a reciprocating, fluid driven plunger. As the bundling straps are advanced by the plunger, the bundling strap passes about the plurality of articles to be bundled until the tail end portion of the bundling strap enters and passes through the apertured head end portion. On the return stroke of the plunger the tail end portion of the bundling strap is, in successive steps, drawn by a gripping device until a predetermined tension exists in the bundling strap, rotated to lock the strap, the excess strap is cut off at the head end portion and the excess ejected from the tool.

BACKGROUND OF THE INVENTION

Field of the invention

The invention is directed to the field of bundling a plurality of discrete articles. Principally, the automatic bundling strap installing tool is directed to the typing of discrete conductors into cable bundles as during the making of wire harnesses. It is equally applicable to discrete conductor lengths or conductor lengths of indeterminate length, whether installed or not. The tool is also applicable to typing conductors to messenger cables, tying steel rods, etc.

DECRIPTION OF THE PRIOR ART

Tools available, according to the prior art are manually operable and require the user to perform certain preliminary manual operations before use of the tool. For example, in tying a plurality of conductors into a cable bundle or wire harness it was necessary for the user to place the cable bundling strap about the individual conductors while holding them together to form the bundle. The bundling strap could be passed under the conductors by lifting the conductors or by using a chute-type device for directing the bundling strap about the conductors. The tail end portion of the bundling strap was then directed through the aperture in the apertured head end portion and the tail end portion pulled by hand to tighten the bundling strap. While holding a portion of the strap, the tail end portion was inserted into a manual tool for final assembly. The manual tool tightened the strap to a predetermined tension, twisted the strap to lock it, and then cut off the excess. The excess then had to be removed from the tool. The above operation was repeated for each bundling strap.

SUMMARY OF THE INVENTION

The invention is directed to an automatic, cartridge loaded, fluid operated bundling strap installing tool which overcomes all of the problems noted above with respect to prior art devices and eliminates the need for manual steps prior to tool use. The tool provides selectively closing jaws which serve to retain the loose conductors into a bundle and which provides a chute for positioning the bundling straps about the conductors. Bundling straps are provided from preloaded magazines which eliminates the necessity for the individual, manual placement of bundling straps about the conductors. Once the strap has been positioned about the conductors, the tail end portion is directed through the aperture of the prepositioned head end portion of the strap. The strap is tightened to a preset tension and is then twisted to lock the strap to the head-end portion. The excess of the strap is cut off and ejected from the tool.

All steps are automatically performed in sequence with the power supplied from a fluid source. The fluid also provides an interlock to prevent any attempt to restart the tool once a cycle of operation has been started. It is therefore an object of this invention to provide an automatic, cartridge loaded, fluid operated bundling strap installing tool.

It is another object of this invention to provide an automatic, cartridge loaded, fluid operated bundling strap installing tool with selectively operable jaws, which can be placed about a plurality of articles to be bundled and which, when closed, will retain said plurality of articles in said bundle and provide a chute for placement of a bundling strap therearound.

It is another object of this invention to provide an automatic, cartridge loaded, fluid operated bundling strap installing tool, employing fluid means to operate all steps of the tool operation and which provides an interlock against unwanted restarting during an operating cycle.

It is yet another object of this invention to provide an automatic, cartridge loaded, fluid operated bundling strap installing tool which sequentially apply a bundling strap about a bundle of articles, tightens it to a predetermined tension, locks it, and cuts off and ejects any excess strap.

Other objects and features of the invention will be pointed out in the following description and claims and illustrated in the accompanying drawings, which disclose, by way of example, the principal of the invention, and the best mode which has been contemplated for carrying it out.

BRIEF DESCRIPTION OF THE DRAWINGS

In the drawings:

FIG. 11 is a side elevation, similar to FIG. 10, with a portion of the mechanism in a first operative condition.

FIG. 12 is a side elevation, similar to FIG. 10, with a portion of the mechanism in a second operative condition.

FIG. 13 is a side elevation, in section, of a portion of the plunger 120 of FIG. 12.

FIG. 14 is a sectional, side elevation of the plunger 120 of FIG. 11.

FIG. 15 is a fragmentary view of the helical shell and detent of FIG. 10.

FIG. 17, composed of portions A and B, shows the operation of the knife, taken along the lines 17—17 of FIG. 14.

Similar elements are given similar reference characters in each of the respective drawings.

DESCRIPTION OF THE PREFERRED EMBODIMENT

Figure 1:
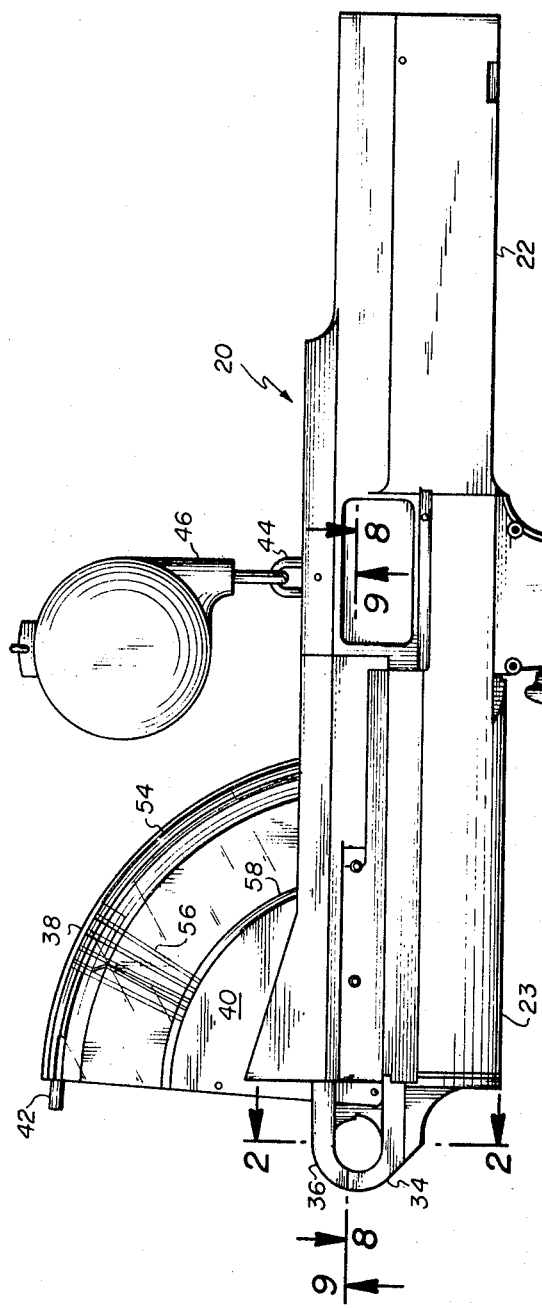
FIG. 1 is a side elevation of an automatic bundling strap installing tool constructed in accordance with the concepts of the invention.
Figure 2:
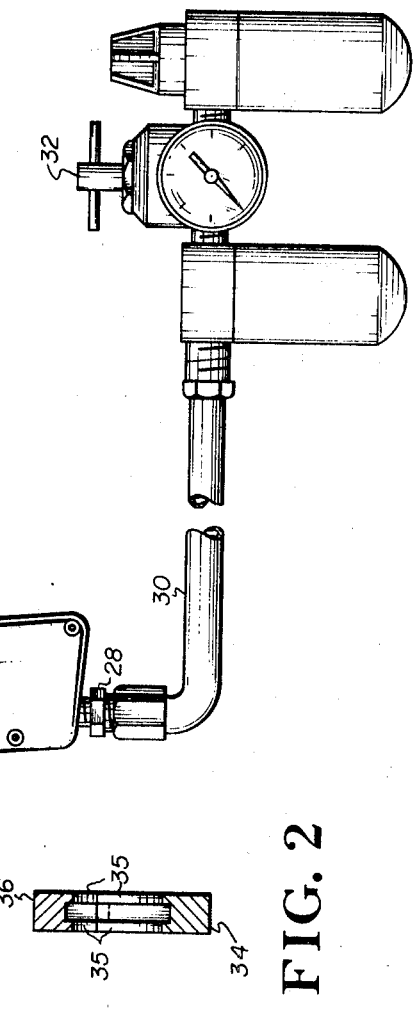
FIG. 2 is a view, in section, of the strap channel in the jaw portion of the tool of FIG. 1 taken along the lines 2—2.
Figure 10:
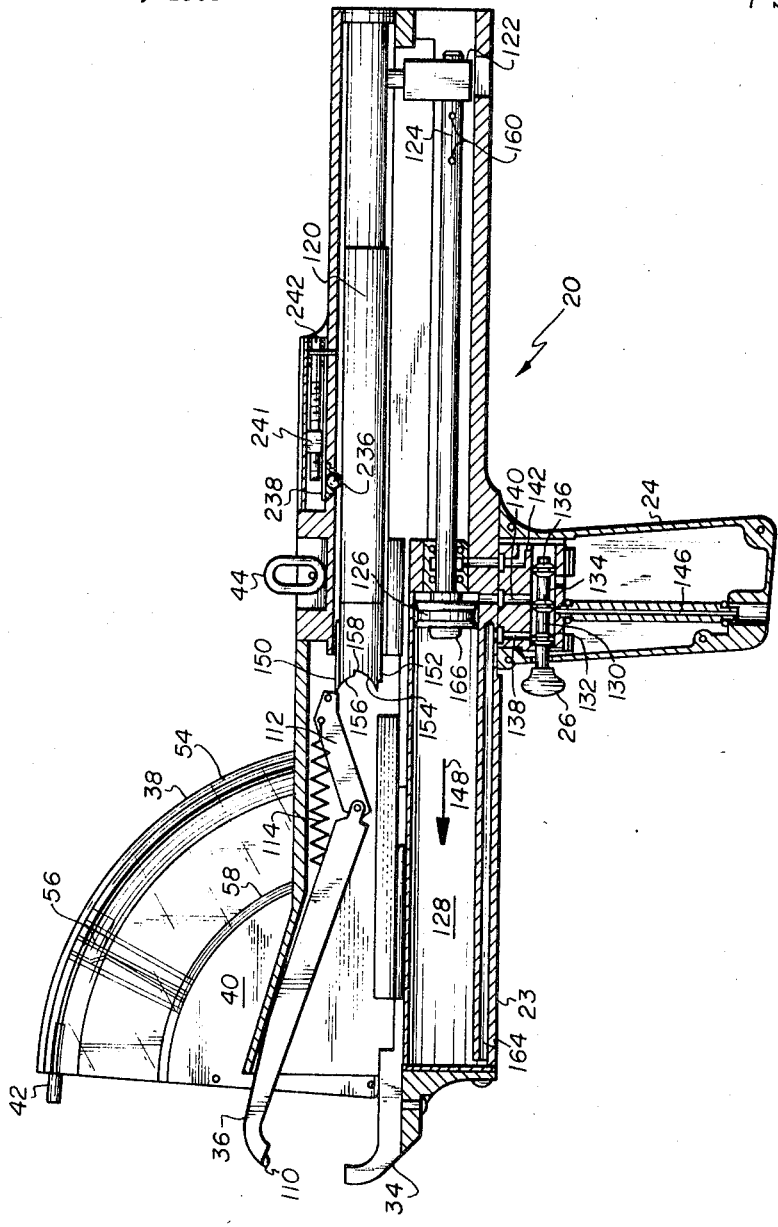
FIG. 10 is a side elevation, in section, of the tool of FIG. 3, taken along the lines 10—10.

Referring now to FIG. 1, there is shown an automatic bundling strap installing tool 20 constructed in accordance with the concepts of the invention as shown. Tool 20 is shown with its entire housing in place so that the overall features of the tool may be appreciated. Tool 20 consists of a housing 22 and a handle 24 having mounted thereon a trigger 26. At the bottom portion of the handle 24 is a fitting 28 for the reception of fluids under high pressure introduced by means of a hose 30 via a regulator 32 from a fluid source (not shown). At the application end 23 of the tool 20 are found a set of jaw members, 34 and 36. The lower jaw member 34 is stationary while the upper jaw member 36 is movable with respect thereto. As is shown in FIG. 1, jaw members 34 and 36 are closed. This is the position which the jaws would occupy during the installation of a cable bundling strap to a cable bundle already contained within the jaws. The movable upper jaw member 36 is movable to a position as shown in FIG. 10 for receipt of a plurality of wires to be bundled therebetween. Once the plurality of wires have been placed upon the stationary lower jaw member 34, the upper movable jaw member 36 is closed to hold the plurality of wires into a bundle and to facilitate the introduction of a cable bundling strap thereabout. As is shown in FIG. 2, which is a sectional view of the jaw members 34 and 36 in their closed position, it can be seen that each of the jaw members, 34 and 36, are provided with tabs 35 to form a channel for the introduction of a cable bundling strap therein and to guide the strap as it is moved about the closed jaw members, 34 and 36, and thus about the plurality of wires placed within the jaws. Means to be described below, in greater detail, will cause the introduction of the bundling strap within the channels of the jaw members 34 and 36 and will cause them to be moved through the channels to form a desired loop about the plurality of wires within the jaws.

Mounted atop the tool housing 22, at the application end 23 is a cartridge receiver 40 which will support, lock and provide for the feeding of cable bundling straps contained within a cartridge 38 inserted therein into the tool 20. Removable plugs 42, at each end of the cartridge 38 (only one of which is visible in FIG. 1) are used to retain the cable bundling straps within the cartridge 38, but after the introduction of the cartridge 38 into the cartridge receiver 40 one of the removable plugs 42 will be removed, by means to be described below, and the cable bundling straps will then be urged into the tool 20 by means to be described below. In order to help support the weight of the tool 20 and to provide for balancing, a hook 44 is provided in the upper portion of the housing 22 which may readily be attached to a counter weighted support member such as 46.

Figure 4:
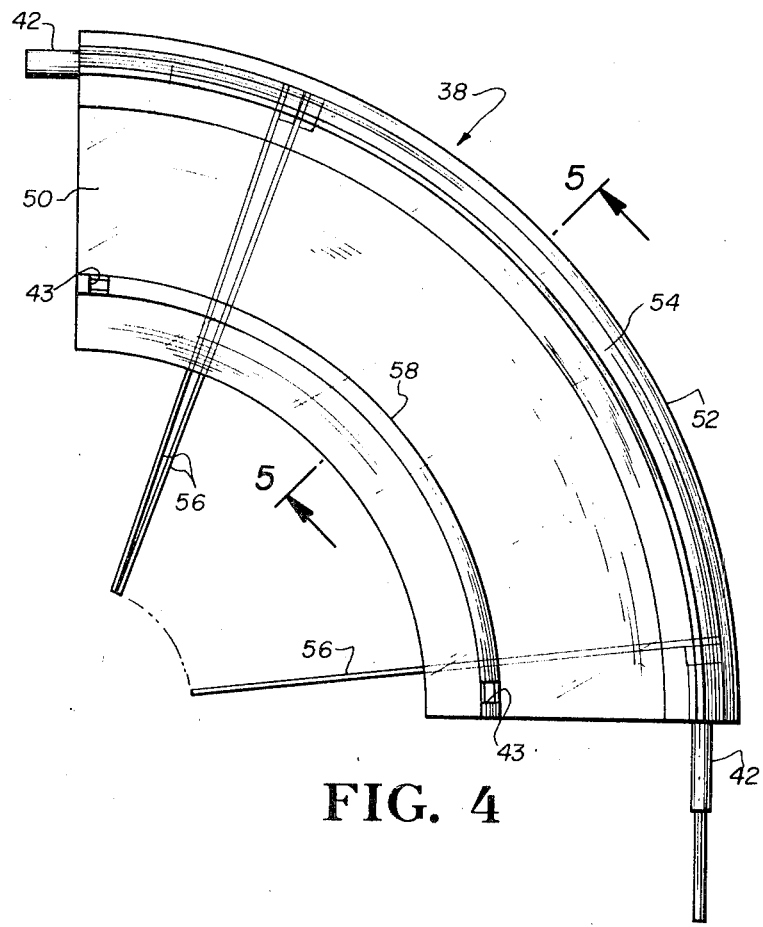
FIG. 4 is a side elevation of a cartridge employed with the tool of FIG. 1.
Figure 5:
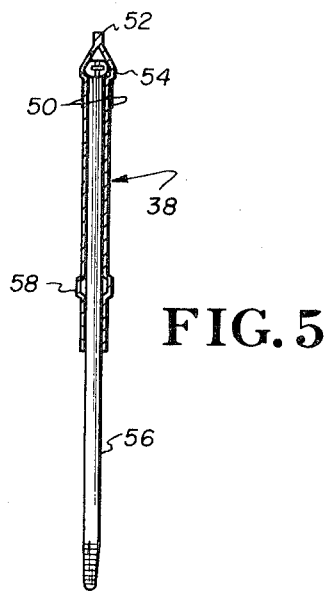
FIG. 5 is a sectional view of the cartridge of FIG. 4 taken along the lines 5—5.

Referring now to FIGS. 4 and 5, the details of the cable bundling strap cartridge 38 may be readily appreciated. Cartridge 38 may be fabricated from a clear plastic material, such as nylon or any other similar material. As is shown in FIG. 5, it is made of two shell portions 50 which are identical and are cemented together as at 52. A first groove 54 is provided for receipt of the head end portion of the cable bundling straps 56. Cable bundling straps 56 may be of the type shown and described in U.S. Pat. No. 3,022,557 to M. C. Logan, issued Feb. 27, 1962, for a "Cable Bundling and Supporting Strap," assigned to the assignee of the instant application, or any other convenient type of cable bundling strap available in the art. The cable bundling straps 56 are mounted all along the length of the slot 54 and are held in position by means of the removable plugs 42 placed at either end. A ridge 58 defines the contact and support rib of the cartridge 38 to mate with the cartridge receiver 40 of the tool 20. As will be described below the cartridge 38 will be placed in the cartridge receiving means 40 and by means to be described below, the plug 42 at the lower end of the cartridge 38 will be removed when it is desired to use the cable bundling straps 56 from the cartridge 38. Locking slots 43 at both ends of the cartridge 38 are engaged by locking tabs to be disclosed below to retain the cartridge 38 in the cartridge receiver 40.

Figure 6:
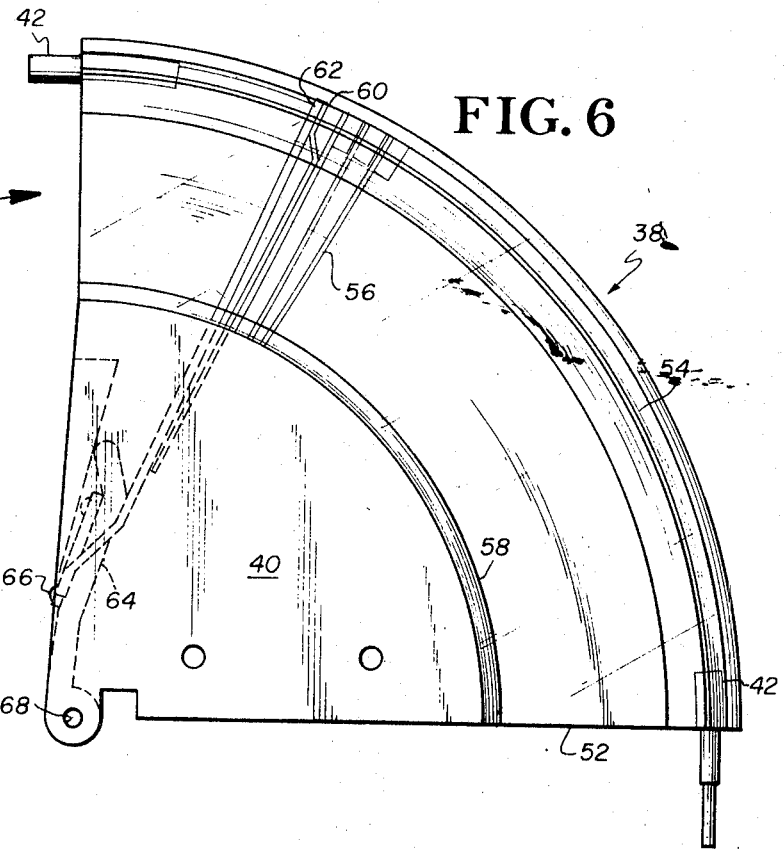
FIG. 6 is a side elevation of the cartridge of FIG. 4 installed in the cartridge receiving means of FIG. 1.

In FIG. 6 there is shown additional details of the cartridge receiver 40. The individual cable bundling straps 56 are urged from the cartridge 38 by means of a flat spring 60 mounted upon a connecting arm 62. The connecting arm 62 is in turn connected to a spring loaded arm 64 by means of the fasteners 66. By means of the action of the spring loaded arm 64 and the flat spring 60 the individual cable bundling straps 56 are urged from the cartridge 38 into the tool 20 for installation about a plurality of wires to be bundled. Spring loaded arm 64 is pivoted about a pivot point 68.

Figure 7:
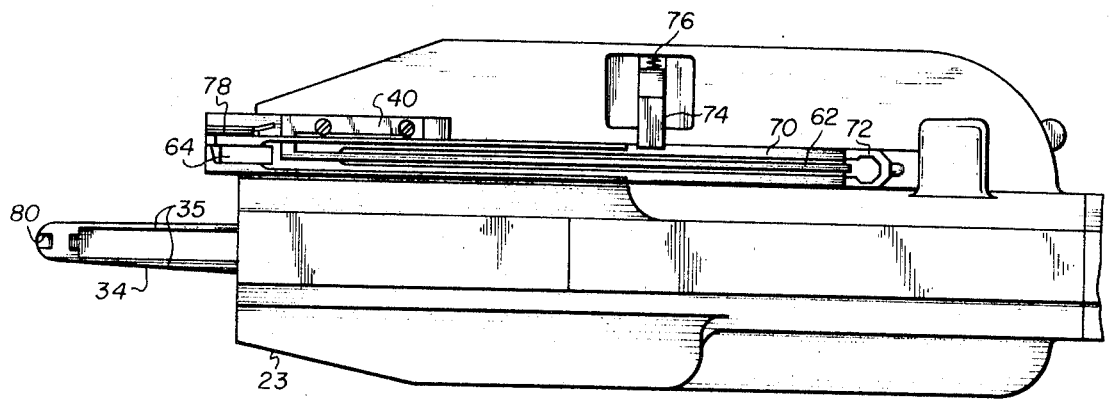
FIG. 7 is a top plan view of the installing end portion of the tool of FIG. 1.

Turning now to FIG. 7, the details of the upper portion of the application end 23 of the tool 20 are shown. For the sake of simplicity the cartridge 38 and the movable jaw member 36 are not shown in this figure. The cartridge 38, however, will be positioned within the slot 70 and will engage with the cartridge receiver 40. The connecting arm 62 and the flat spring 60 (not visible) will engage the cable bundling straps 56 in the cartridge 38 and will urge them into the positioning plate 72. The positioning plate 72 is of the same shape as the outline of the cable bundling straps 56 and will thus permit cable bundling straps 56 to enter the tool 20 in the proper position, that is with the head portion and body portion correctly placed and would thus prevent the introduction of a bundling strap 56 which in some way had been placed in the cartridge in the incorrect position. The cartridge 38 is locked into position by means of the lock tab 74 which is spring urged by means of compression spring 76 into contact with the locking slots 43 on the cartridge 38 to thus hold the cartridge 38 in position. The cartridge 38 may be released by the application of force against the lock tab 74 in a direction to compress spring 76. As can better be seen in this figure, spring biased arm 64 is biased by means of the coil spring 78 which urges the flat spring 60, carried by the connecting arm 62, into engagement with the cable bundling straps 56. The lower fixed jaw member 34, in addition to having tabs 35 to insure passage of the cable bundling straps 56 through the jaw member in the desired position, also has an additional slot 80 for receipt of a tongue, to be described below, on the upper movable jaw member 36 to correctly position the upper and lower jaw members 34 and 36 respectively with respect to one another.

Figure 8:
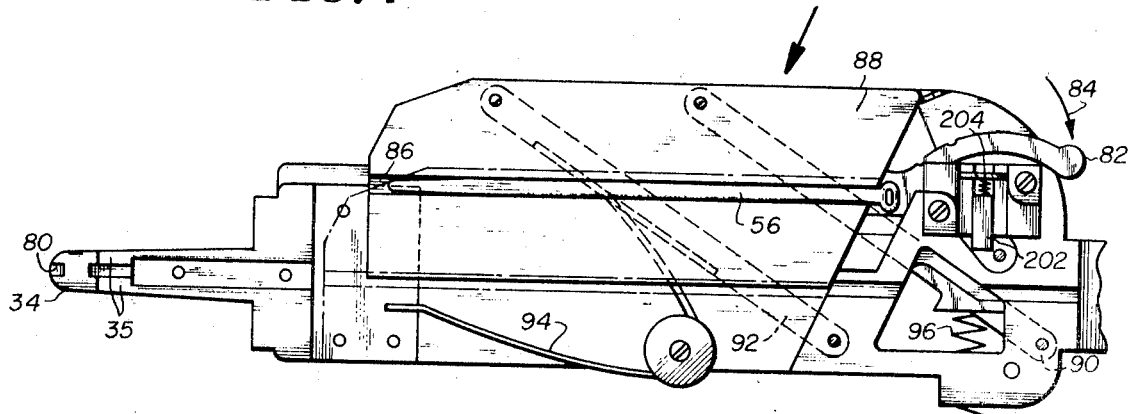
FIG. 8 is a top plan view of the transfer plate of the tool taken along lines 8—8 of FIG. 1.

Turning now to FIG. 8, the details of the transfer mechanism for transferring cable bundling straps 56 from their entry point into the tool 20 from the magazine 38 to the line of movement of the plunger, to be described below, can be better appreciated. In order to remove the plug 42 to permit the entry of cable bundling straps 56 into the tool 20, the lever arm 82 will be moved in the direction shown by the arrow 84 to uncover a slot (not shown) through which the lower plug 42 is allowed to extend when the cartridge 38 is positioned within the cartridge receiver 40. The plug 42 is removed from the bottom portion of the tool 20 and the arm 82 is returned, to cover up the slot once the plug 42 has been removed. Cable bundling straps 56 once having passed through the positioning plate 72, as shown in FIG. 7, are permitted to enter the channel 86 in the transfer plate 88. The transfer plate 88, shown in solid line, is in the position which will occupy when the tool 20 is ready to receive a cable bundling strap 56 from the cartridge 38. As the plunger, to be described below, moves along its path, it will force a cam on its lower surface to engage link 90 to force the transfer plate 88 to move in a slightly arcuate, but generally lateral direction towards the lower portion of the FIG. 8 and take up a position as shown by the dashed lines of the figure. An additional link 92, cooperating with link 90 helps control transfer plate 88 to move in its desired, generally lateral, slightly arcuate path. Compression springs 94 and 96 acting upon the links 92 and 90, respectively, will urge the transfer plate 88 back to its initial position, as shown in solid line, once the cam of the plunger ceases to act upon the link 90.

When the transfer plate 88 is in the position shown by the dashed lines, channel 86, in the transfer plate 88, is aligned with the channel of the lower nonmovable jaw member 34 created by the tabs 35. In this manner the movement of the plunger, in addition to urging the transfer plate 88 from its initial position to the position shown in dashed line will also urge forward the cable bundling strap 56 positioned within the channel 86, into and about the channel within the jaw members 34 and 36 and thus about the plurality of wires captured within the closed jaws. The channel 86, as it extends towards the non-movable jaw member 34 is inclined in a downward direction so that the tail end portion of the cable bundling strap 56 occupies a plane lower than the head end portion of the cable bundling strap 56. As will be described below, with reference to the manner of installation of the cable bundling strap 56 about a plurality of wires, this arrangement will facilitate the lifting of the head end of strap 56 so that the tail end portion may be inserted through the aperture in the head end portion after the tail end portion has been introduced about the plurality of wires to be bundled.

Figure 9:
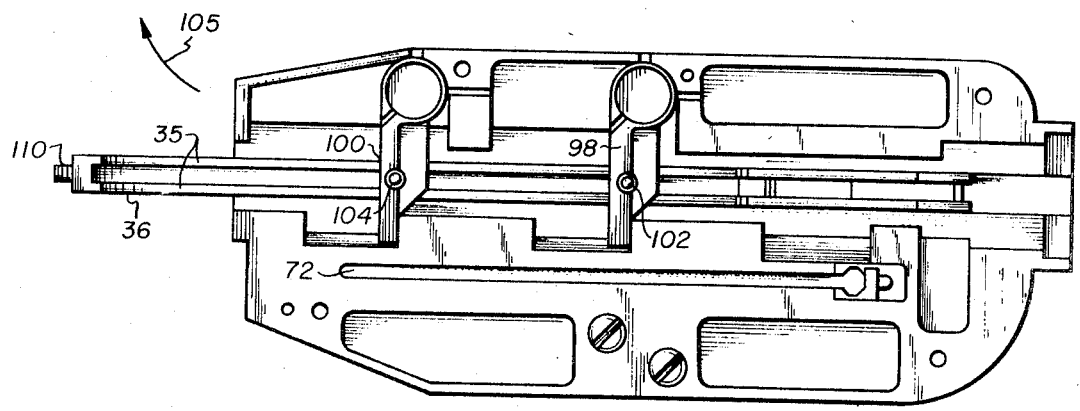
FIG. 9 is a bottom plan view of the tool taken along the lines 9—9 of FIG. 1.

Turning now to FIG. 9, a bottom plan view of the upper portion of the application end 23 of the tool 20 is shown. Visible in this view is a portion of the positioning slot 72 through which cable bundling straps 56, from the cartridge 38, are admitted into the tool 20. In order that the bundling strap 56 be retained within the channel 86 two links, 98 and 100, are provided. Spring loaded ball detents 102 and 104, mounted upon the links 98 and 100, respectively, will control the position of the cable bundling strap 56 in channel 86 of transfer plate 88 from the plate position adjacent magazine 38 to the line of action of the plunger. Links 98 and 100 are arranged to move in the direction shown by arrow 105 as the plunger advances to prevent interference with its movement. Springs (not shown) will return the links 98 and 100 to the position shown in FIG. 9 when the plunger returns to its initial position.

Figure 3:
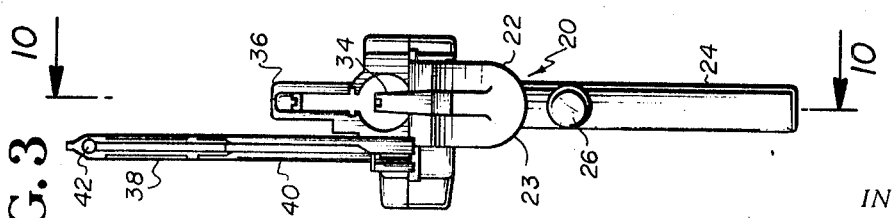
FIG. 3 is a front elevation of the tool of FIG. 1.

Turning now to FIGS. 3 and 10 additional details of the tool 20 may be appreciated. FIG. 3 shows a front elevation of tool 20 with a cartridge 38 installed. In addition, jaw members 34 and 36 are shown in their open position. FIG. 10 represents a sectional view of FIG. 3 taken along the lines 10—10. The upper movablbe jaw member 36 has a tongue member 110 which will engage with the slot 80 of the lower fixed jaw member 34 to prevent possible lateral movement of the jaw member 34 and 36 with respect to one another. Movable jaw member 36 is coupled to a link 112 which is engageable by a cam 150 on the upper surface plunger 120. Upon the forward movement of the plunger 120, cam 150 will engage the link 112 causing the closure of the upper movable jaw member 36 into engagement with the lower fixed jaw member 34 and causing the tongue 110 to engage the slot 80. When the plunger 120 returns to its initial position, return spring 114 will cause the upper removable jaw member 36 to return to its initial open position to permit the removal of the bundled plurality of wires and the introduction of a further plurality of wires to be bundled.

Plunger 120 is propelled by means of fluid introduced through the various ports within the handle 24 as controlled by the trigger 26. Plunger 120 is coupled by means of coupling 122 to a piston shaft 124. The piston shaft 124 terminates in a piston head 126, free to move in the piston chamber 128. Mounted on the trigger shaft 130 of the trigger 26 are a plurality of valves 132, 134 and 136. The valve 132 controls the port 138, while the valve 134 controls the port 140, and the valve 136 controls the bleader port 142, to restore the trigger 26 to its initial position. When the trigger 26 is depressed, that is moved to the right in FIG. 10, valve 134 permits the introduction of fluid from the duct 146 to the port 140 which admits fluid behind the piston head 126 and causes the piston to be forced in a direction, shown by the arrow 148. As a result of the coupling 122, between the piston shaft 124 and the plunger 120, the plunger 120 will similarly be moved in the direction indicated by the arrow 148. The cam 150 on the top of the plunger 120 will engage the link 112 and cause the closure of the movable jaw member 36. At the same time cam 152 on the bottom surface of the plunger 120 will engage the transfer plate link 90, as shown in FIG. 8, causing the transfer plate 88 to move from a position under the cartridge 38 in the cartridge receiver 40 to a position in line with the moving plunger 120. The forward face of the plunger 120 is provided with a lower inclined face 152 and an upper inclined face 156. The lower inclined face 154 has a slot 158 therein to receive and position the head of a cable bundling strap 56. As the plunger 120 traverses the transfer plate 88 (FIG. 8) the head of the strap 56 is permitted to slide along the inclined face 154 and to enter the slot 158 for positioning with respect to the tail end portion as it is brought around the plurality of wires to be bundled. The inclined upper face 156 permits the smooth transition of the tail end portion of the cable bundling strap and its introduction through the aperture in the head end portion, positioned within the slot 158.

As the piston head 126 nears the end of its chamber 128 ports 160 will allow a portion of the pressure built up in chamber 128 to escape via the port 142 and apply pressure to the back end of the valve 136 causing the trigger 26 and trigger shaft 130 to move in a direction as shown by the arrow 148. The trigger shaft 130 moving in the direction indicated by the arrow 148 will cause valve 132 to uncover port 138 and permit the fluid from duct 146 to be introduced via duct 164 to a position in front of the piston head 126. Spacer 166, at the leading portion of the piston head 126, will insure that an adequate space will be provided between the piston head 126 and the end of the chamber 128 for the fluid admitted via the duct 164. This fluid will cause the piston head 126 to be returned in a direction opposite the arrow 148. Movement of the piston head 126 in the direction opposite the arrow 148 will cause the plunger block 120 to move in a direction opposed to the direction shown by the arrow 148 thus restoring the transfer plate 88 (FIG. 8) to its initial position and causing the opening of the jaw members 34 and 36. Up to this point the plunger 120 has been treated as a single unitary member for purposes of simplicity. Its actual functioning will be described below with reference to the remaining figures.

Turning now to FIG. 11 the piston head 126 is shown at the end of its travel so that the spacer 166 abuts the end wall of the chamber 128. In this position, although the cable bundling strap 56 is not shown, a cable bundling strap 56 would have been advanced from the transfer plate 88 (FIG. 8) and would have had its tail end section moved through the channel within the jaw members 34 and 36 and the tail end thereof would have been inserted through the head end portion of the cable bundling strap 56.

Reference is now made to FIG. 13 which shows the plunger 120 in section to expose the gripping block 170. Gripping block 170 has an outer shell portion 172, an inner block 174. The front face of the inner block 174 has an inclined face 176 which receives the inclined face of a jaw 178, the bottom surface of which is ribbed to facilitate grasping of a cable bundling strap 56 inserted therein. A planar jaw 180 is opposite the ribbed jaw 178. Jaw 178 is urged towards the left of the figure by means of a compression spring 182. It should be noted that the leading edge of the jaw 178 extends beyond the edge of the planar jaw 180, so that its contact with sealing ring 184, under conditions to be described below, will cause the separation of jaws 178 and 180 releasing a cable bundling strap 56 held therebetween. As the fluid from the source traverses the duct 146 and enters the port 138 uncovered by the valve 132, as shown in FIG. 10, a portion of the plunger 120 begins to move in a rearward direction away from the applying end 23. This operation is shown in FIG. 12, and reference is now made to such figure. As shown in FIG. 12, the piston head 126 is now directed in the direction as shown by the arrow 190 which is opposite to that shown by the arrow 148 in the FIG. 10. The first portion of the plunger 120, called the threading block 200, is held in its forward position by means of a lock 202 as shown in FIG. 8. The lock member 202 urged in the position by means of compression spring 204 engages a stop (not visible) when threading block 200 is in the position shown in FIG. 11. This action prevents the threading block 200 from moving back with the remaining portion of the plunger 120. The helical shell portion 210 is driven back by means of the coupling 122 as the piston head 126 is forced in the direction shown by the arrow 190. By means of the connecting shaft 212, the gripper block 170 of FIG. 13, is caused to move in the direction shown by the arrow 190. As a result of this movement and the resistance of the cable bundling strap 56, the jaw 178 is caused to securely grip the tail end portion of the cable bundling strap 56 between its ribbed surface and the planar jaw 180. As the helical shell 210 is caused to move further in the direction indicated by the arrow 190, additional tension is applied to the cable bundling strap 56 and it is tightened about the bundle of wires, placed within the closed jaw members 34 and 36.

As is shown in FIG. 14 which illustrates the internal portions of the plunger 120 in the fully forward position (as in FIG. 11) the tail end portion of the cable bundling strap 56, in addition to engaging the jaws 178 and 180, is also forced to engage further jaw 220 which is urged to position by the compression spring 222. The additional jaw 220 is arranged so that as the cable bundling strap 56 is advanced it will offer little resistance to its movement. However, should any attempt be made to move the cable bundling strap 56 in a direction towards the bundle of cables shown in the closed jaw sections, the jaw 220 will clamp the cable bundling strap 56 and prevent such forward motion.

At this point the manner of drive of the helical shell 210 should be considered. The coupling 122, between the helical shell 210, is shown in FIG. 15 which illustrates only the helical shell 210 and its coupling 122. The coupling 122 terminates in a drive pin 230 which rests in a helical slot 232 on the surface of the helical shell 210. A rib 234 runs along the entire top portion of the helical shell 210. This rib is engaged by means of a ball detent 236 held in position by means of a spring 238 (shown for illustrative purposes in this figure as being a compression spring). As will be clear wtih reference to FIG. 10, the spring is actually a flat spring whose spring value can be adjusted by a means yet to be described. As long as the ball detent 236 continues to ride on the side of the rib 234 shown, the helical shell 210 is forced to move in the direction of the coupling 122.

Turning now to FIG. 16, the relationship between the ball detent 236 and the rib 234 of the helical shell 210 are shown. As is shown, as long as the ball detent 236 remains in the position shown, to the left of the rib 234, rotation of the helical shell 210 is not possible. However, as will be described below, when the tension applied to the cable bundling strap 56 exceeds the setting of the spring 238, rib 234 will be permitted to lift the ball detent 236 out of position and the helical shell 210 will be free to rotate in the direction shown by the arrow 240. At this point the drive pin 230 will traverse the helical slot 232 and in addition to driving the helical shell 210 in the direction shown by the arrow 190 of FIG. 12 will also permit it to be rotated in a direction shown by the arrow 240. The purpose for this rotation will be described below.

Figures 16A, 16B, 16C:
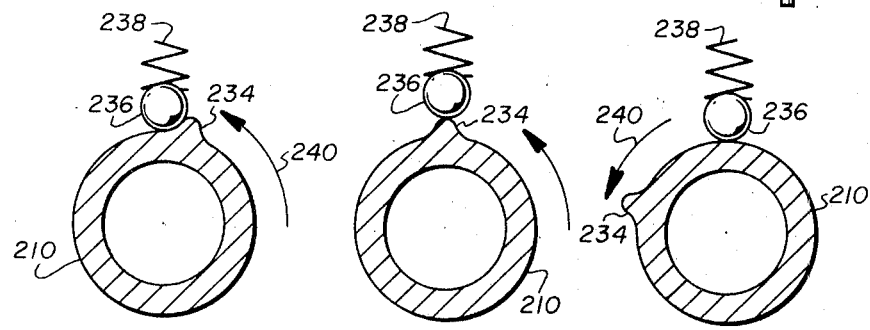
FIG. 16, composed of portions A, B and C, shows, in section, details of the helical shell and detent taken along the lines 16—16 of FIG. 14.

Returning now to FIGS. 12 and 13, as the gripper block 170 is caused to move in the direction of the arrow 190 it will continue to apply tension to the cable bundling strap 56. A tension setting device is shown in FIG. 10, whereby the ball detent 236 tension is set by means of a flat spring 238. The spring characteristics of the flat spring 238 are set by means of a block 241 which rides along a groove 242 in the upper portion of the housing 22. As the screw 242 is turned the block 241 rides along the screw 242 and thus lengthens or shortens the effective spring characteristic of the flat spring 238. As a result the tension applied to the ball detent 236 is similarly varied. When the tension applied to the bundling strap 56 is equal to or slightly exceeds the preset tension achieved by the position of the block 240, the ball detent 236 is lifted as is shown in FIG. 16B and the helical shell 210 is permitted to rotate in the direction of the arrow 240. This rotation will provide the desired locking and cutting action for the installed cable bundling strap 56.

This twisting and cutting action is achieved in the following manner. Referring to FIG. 13, there is shown a twisting plate 250 having upstanding shoulders 252 and 254. An aperture 256 permits the movement of the cable bundling strap 56 therethrough. After the ball detent 236 has moved out of position and the helical shell 210 is permitted to rotate the connecting shaft 258 coupled to the gripping block 170 causes rotation of the twisting plate 250 and begins the operation of the knife blade 260. The knife 260 is better illustrated in FIGS. 17A and 17B. FIG. 17A shows the upstanding shoulder 252 of the twisting plate 250 and shows the aperture 256 therethrough. Coupled to the upstanding plates 252 and 254 is the knife blade 260 which has fixed camming surfaces 262 and 264. In the nonrotated position the twisting plate 250, knife blade 260 is held out of contact with a cable bundling strap 56 placed through the aperture 256. However, as soon as rotation of the gripping block 170 causes rotation of the twisting plate 250, knife blade 260 comes into contact with fixed stop 264 and causes the cutting off of the tail end portion of the cable bundling strap as the twisting plate 250 continues to rotate. After the cut off action has been completed and as the rotation of the gripping block 170 continues, a cam (not shown in the figures) will strike lock 202 (FIG. 8) causing its disengagement. As a result, the gripper block 170 and threading block 200 will move in a rearward direction as shown by the arrow 190 in FIG. 12. The snapping back of the gripping block 170 will bring the sealing ring 184 into contact with the leading edge of the inclined jaw 178 causing its release. As the threading block 200 continues to move in a rearward direction, caused by the urging of the compression spring 270, the cut off tail portion of the cable bundling strap 56 will be caused to be ejected through an aperture 272 mounted to the rear portion of the helical shell 210.

Now that the respective details of the mechanism have been described, a typical operation will now be set forth so that the overall operation of the automatic installing tool may be better appreciated. Prior to the use of the tool, it will be coupled by means of coupling 28 and a hose 30 to a regulator 32 and thence to a source of fluid of proper pressure (FIG. 1). The support members such as 46 will be coupled to the hook 44 to support the tool 20. Further, the desired tensioning for the cable bundling straps 56 to be employed will be set by means of the screw 242 to position the block 240 as shown in FIG. 10. This will establish the desired tension in the straps 56 and the tension at which the ball detent 36 will be allowed to release. A cartridge 38, containing cable bundling straps 56, will be positioned in the cartridge receiving means 40 and locked by means of the lock 74 (FIG. 7). The lock 74 will engage the locking slot 43 as is shown in FIG. 4. Flat spring 60 (FIG. 6) will be caused to engage bundling straps 56 placed within the cartridge 38 to permit their feeding into the tool as is required. At this point the arm 82 as is shown in FIG. 8 will be rotated in direction shown by the arrow 84 to permit the plug 42 of the cartridge 38 to be inserted within an aperture not shown. The plug 42 may then be removed by means of the aperture to permit the feeding of the cable bundling straps 56 from the cartridge 38 under the urging of the flat spring 60. Upon removal of the plug 42 the arm 82 is moved in the direction opposite that shown by the arrow 84 to seal the aperture. As the result of the urging of the flat spring 60 the first cable bundling strap 56 will be urged from the cartridge 38 and will be permitted to pass through the positioning plate 72 as shown in FIG. 7 and enter channel 86 of the transfer plate 88 as shown in FIG. 8. Cable bundling strap 56 will take the position as shown in FIG. 8 and will be held such that the head end portion is slightly elevated with respect to the tail end portion caused by the urging of the flat springs 98 and 100 as shown in FIG. 9. A plurality of wires to be bundled is placed atop jaw member 34. At this point, the trigger 26 is now depressed.

As the trigger 26 moves towards the handle 24, it will cause the trigger shaft 130 to displace the valves 132, 134 and 136 to the position as shown in FIG. 10. As a result of the movement of the valve 134, port 140 will now be exposed to the fluid traveling through the duct 146. This fluid will now be introduced behind the piston head 126 and will cause its movement in the direction of the arrow 148. As the piston head 126 begins to move, it will by means of the shaft 124 cause the coupling 122 to move along with it thus moving the plunger 120 in the direction shown by the arrow 148. As cam 150, atop the plunger 120 contacts the link 112 it will cause the closure of the movable jaw member 36 causing engagement of the tongue 110 with the corresponding slot 80 as is shown in FIG. 7. Thus the closed jaw arrangement as is shown in FIG. 1 is created, holding the plurality of wires into a bundle and also providing a track and guide for a cable bundling strap 56 to be passed about the plurality of wires to be bundled. Further, the cam 152, on the bottom portion of the plunger 120 will engage the link 90 of the transfer plate 88 as shown in FIG. 8 and cause the translation of the transfer plate 88 from the position shown in solid line in FIG. 8 to the position shown in dashed line. The movement of transfer plate 88 will position the cable bundling strap 56 directly in the path of the moving plunger 120. As the plunger 120 continues to move the lower inclined face 154 of the plunger 120 will begin to lift the head of the cable bundling strap 56 and position it within the slot 158 therein (FIG. 10). As the plunger 120 continues to move in a forward direction, the cable bundling strap 56 will be advanced along the channel 86 of the transfer plate 88 and will be caused to enter within the channel of the jaw members 34 and 36 created by the tabs 35. Cable bundling strap 56 will pass completely about the channel within the jaw member 34 and thence into the jaw member 36. As the tail end portion leaves the jaw member 36, it will strike the inclined face 156 of the plunger 120 and cause the tail end portion to enter the head end portion of the cable bundling strap 56.

As the plunger 120 completes its movement to the end of the chamber 128, the tail end portion of the cable bundling strap 56 which has already been passed through the apertured head end portion is permitted to enter through aperture 256 of the twisting plate 250 past the knife 260 and thence between the jaws 178 and 180 of the gripping plate 170. It should be recalled that the end of the stroke of the previous cycle, when the threading block 200 was returned to its initial position, the engagement between the ring 184 and the leading edge of the inclined jaw 178 cause the opening of the jaw 178 with respect to the planar jaw 180. Thus the tail end portion of the cable bundling strap 56 is permitted to pass between the jaws 178 and 180 of the gripper plate 170 and thence pass to the second gripping jaw 220 (FIG. 14). To this point the only tensioning of the cable bundling strap 56 which has occurred is due to the continued urging of the strap 56 forward by means of the plunger 120 as it continues to move in the direction shown by the arrow 148 (FIG. 10). Plunger 120 finally comes to rest as the piston head 126 moves to the position where its spacer 166 is in contact with the far wall of the chamber 128. At this point, a portion of the fluid occupying the chamber 128 is permitted to enter the first of the apertures 160 positioned within the chamber 128. The fluid passes through a chamber (not shown) within the shaft 124 and exits from the second of the apertures 160. This fluid will pass via the port 142 to the space behind the valve 136 and will cause the valve 136, trigger shaft 130 and the trigger 26 to move to the left in the FIG. 10. As a result of this movement, valve 132 now exposes port 138 to the fluid from the duct 146. The fluid is now permitted to pass along the duct 164 and thus be applied to the front of the piston head 126 forcing the piston to begin its movement in the direction shown by the arrow 190 in FIG. 12. Lock member 202, as shown in FIG. 8, urged by means of the compression spring 204, causes the threading block 200 to be retained in the forward position as shown in FIG. 11. The backward movement of the piston head 126 will cause, via the coupling 122, the backward movement of the helical shell 210 as well as the coupling shaft 212 and the gripping block 170. As the gripping block 170 is caused to move in the direction of the arrow 190 (FIG. 13) the jaws 178 and 180 will tighten about the tail end section of the cable bundling strap 56 and begin to apply tensioning force to it. Ball detent 236, as shown in FIG. 10, will ride along the rib 234 as is shown in FIG. 15 till such time as the tension applied to the bundling strap 56 is equal to that preset by means of the flat spring 238 (FIG. 10).

At that point, the ball detent 236 will be deflected, as shown in FIG. 16, and the helical shell 210 will rotate as shown by the arrow 240 in FIG. 16. As a result of this rotation the twister plate 250 will be rotated causing the locking of the cable bundling strap 56 against its head. As the twister plate 250 continues to rotate it will cause rotation of the knife 260, as shown in FIG. 17, to a position where the knife blade 260 contacts the fixed stop 264, causing the severing of the tail end portion of the cable bundling strap 56. As the gripping block 170 continues to move back it will hit a release (not shown) and will cause the lock 202 to be disengaged and thus allow release of the threading block 200. Under the influence of the tension spring 270 the threading block 200 will be propelled towards the rear and thus cause the expelling of the excess tail end section through the aperture 272 at the end of the housing 22. The movement of the threading block 200 will cause the sealing ring 184 to engage the leading edge of the inclined jaw 178 and cause the jaws 178 and 180 to be separated thereby permitting the entry of a further cable bundling strap 56 therebetween. Upon the next impression of the trigger 26 a further cycle of operation will be begun.

It should be noted that no provision is made for the return of the trigger 26 to its initial position other than by means of fluid bled from the chamber 128 via the apertures 160. Thus if the fluid source should be turned off during a cycle of operation, upon the reapplication of fluid the tool would complete its cycle of operation until such time as the trigger may be released in the normal course of matters.

While there have been shown and described and pointed out the fundamental novel features of the invention as applied to the preferred embodiment, it will be understood that various omissions and substitutions and changes of the form and details of the device illustrated and in its operation may be made by those skilled in the art, without departing from the spirit of the invention.

The embodiments of the invention in which an exclusive property of privilege is claimed are defined as follows:

1. An automatic installing tool for placing and fastening elongated bundling straps, having apertured head end portions and tail end portions at its respective ends, about a plurality of articles to be bundled comprising: a housing; a fluid operated plunger means mounted within said housing for movement in first and second opposite directions with respect to said housing; fluid receiving means adapted to be coupled to a source of fluid to operate said plunger means; cartridge receiving means for receiving therein a cartridge containing at least one elongated bundling strap; transfer means for transferring elongated bundling straps from a cartridge in said cartridge receiving means to a position adjacent said plunger means; and selectively operable jaw means capable of being operated to a first position to permit the placement of said jaw means about a plurality of articles to be bundled; said jaw means further capable of being operated to a second position to close about said plurality of articles to be bundled whereby the movement of said plunger in said first direction causes an elongated bundling strap to form a closed loop about a plurality of articles to be bundled placed within said jaw means operated to said second position.

2. A tool as defined in claim 1 wherein said jaw means have rib means formed therein to prevent lateral movement of said elongated bundling straps and to control the movement of said bundling straps as they are moved along said jaw means by said plunger means.

3. A tool as defined in claim 1, wherein said plunger means has an inclined leading edge for positioning the apertured head end portion to permit receipt of the tail end portion within the aperture of said apertured head end portion after the elongated bundling strap is positioned about said articles to be bundled.

4. A tool as defined, in claim 1, wherein said plunger means has a slot therein to receive the apertured head end portion of said elongated bundling strap to position said head end portion and to prevent lateral movement of said strap with respect to said plunger means as said plunger means advances said strap to and about said jaw means.

5. A tool as defined in claim 1, wherein the center line of said cartridge receiving means is offset with respect to the center line of said plunger means and said transfer means translates generally laterally to position an elongated bundling strap from said cartridge receiving means in the path of said plunger means.

6. A tool as defined in claim 1, wherein said transfer means has a channel therein to receive elongated bundling straps from a cartridge placed in said cartridge receiving means to prevent relative movement of said strap with respect to said transfer means during the transfer of said strap to a position adjacent said plunger means.

7. A tool as defined in claim 6, wherein said channel in said transfer means is inclined whereby the apertured head end portion of said elongated bundling strap is maintained at a height greater than the tail end portion.

8. A tool as defined in claim 7, further comprising first biasing means mounted on said housing adjacent said transfer means to retain said elongated bundling strap in said channel during transfer and to retain the desired elevational relationship between said apertured head end portion and said tail end portion.

9. A tool as defined in claim 6, further comprising first biasing means mounted on said cartridge receiving means and operable upon elongated bundling straps in a cartridge placed in said cartridge receiving means to cause the transfer of straps from the cartridge into said channel of said transfer means.

10. A tool as defined in claim 9, further comprising an apertured plate mounted on said cartridge receiving means adjacent a cartridge placed in said cartridge receiving means to position elongated bundling straps urged from a cartridge placed in said cartridge receiving means by said first biasing means into the channel of said transfer means.

11. A tool as defined in claim 1, further comprising: locking means mounted on said cartridge receiving means to lock a cartridge placed in said cartridge receiving means and a plug receiving means mounted adjacent said cartridge receiving means to remove the locking plug of a cartridge placed in said cartridge receiving means.

12. A tool as defined in claim 5, wherein said transfer means further comprises a transfer plate, linkage means coupled between said housing and said transfer plate to cause said transfer plate to translate in a generally lateral direction; cam means coupled to said plunger means and engageable with said linkage means to cause said transfer plate to translate towards the line of movement of said plunger means as said plunger means moves in a first direction; and first biasing means coupled between said linkage means and said housing to cause said transfer plate to translate to its initial position adjacent said cartridge receiving means as said plunger means moves in said second direction.

13. A tool as defined in claim 1, wherein said fluid receiving means comprises: trigger means; valve means coupled to said trigger means and operated thereby; and a plurality of ports in said housing to admit fluid to portions of said plunger means; said valve means controlling the admission of fluid to said ports whereby said plunger means is moved in said first and second opposite directions in accordance with the ports to which fluid is admitted.

14. A tool as defined in claim 1, wherein said plunger means further comprises: selectively operated grip means for gripping the tail end portion of an elongated bundling strap; operative means coupled to said grip means and said plunger means to open said grip means when said plunger means is moving in said first direction and close said grip means upon a bundling strap when said plunger means is moving in said second direction whereby said elongated bundling strap is tightened about a plurality of articles to be bundled.

15. A tool as defined in claim 14, wherein said plunger means further comprises: rotation means to rotate said plunger means as said plunger means moves in said second direction whereby said elongated bundling strap is locked with respect to said apertured head end portion about a plurality of articles to be bundled.

16. A tool as defined in claim 15, wherein said plunger means further comprises: cut off means; presetting means mounted on said housing and engageable with said plunger means; said presetting means also coupled to said rotation means whereby when the tension in said strap exceeds the tension setting of said presetting means said plunger means is rotated by said rotation means and the portion of the strap beyond said apertured head end portion is cut off by said cut off means.

17. A tool as defined in claim 16, further comprising ejection means operated by said plunger means whereby the portion of the strap cut off by said cut off means is ejected from said housing.

18. A tool as defined in claim 13, wherein said fluid receiving means further comprises additional port means coupled between said housing and said trigger means to restore said trigger means to an initial position and prevent operation thereof until the tool has completed a single cycle of operation.

19. A tool as defined in claim 1, further comprising a cartridge adapted to be placed in said cartridge receiving means, said cartridge arranged to receive bundling straps along radial lines from its center and plug means removably coupled to said cartridge and engageable with said bundling straps to prevent their removal when said plug means are in place.

20. A tool as defined in claim 9, further comprising a cartridge adapted to be placed in said cartridge receiving means, said cartridge arranged to receive bundling straps along radial lines from its center; said bundling straps being engaged by said first biasing means to cause transfer of bundling straps from said cartridge to said channel of said transfer means and plug means removably coupled to said cartridge and engageable with said bundling straps to prevent their removal when said plug means are in place.

21. A tool as defined in claim 11, further comprising a cartridge adapted to be placed in said cartridge receiving means and locked against movement by said locking means; said cartridge arranged to receive bundling straps along radial lines from its center and plug means removably coupled to said cartridge and engageable with said bundling straps to prevent their removal when said plug means are in place; said plug means engaging said plug removing means whereby said plug means may be removed once the cartridge has been locked into said cartridge receiving means.

References Cited

UNITED STATES PATENTS

| | | | |
|---|---|---|---|
| 3,306,184 | 2/1967 | Hanau | 100—31 |
| 3,323,558 | 6/1967 | Collins | 140—93.6 |
| 3,369,573 | 2/1968 | Baker et al. | 140—93.6 |
| 3,386,478 | 6/1968 | Pitkanen | 140—93.6 |
| 3,391,440 | 7/1968 | Harms | 140—93.2 |
| 3,391,715 | 7/1968 | Thompson | 140—93.6 |
| 3,428,096 | 2/1969 | Krylov et al. | 140—93.6 |

CHARLES W. LANHAM, Primary Examiner

E. M. COMBS, Assistant Examiner

U.S. Cl. X.R.

140—93.2

PO-1050
(5/69)

UNITED STATES PATENT OFFICE
CERTIFICATE OF CORRECTION

Patent No. 3,515,178      Dated June 2, 1970

Inventor(s) Laszlo Hidassy

It is certified that error appears in the above-identified patent and that said Letters Patent are hereby corrected as shown below:

Column 1, line 41, delete "typing" and insert -- tying --

Colun 1, line 46, delete "typing" and insert -- tying --.

SIGNED AND
SEALED
SEP 1 - 1970

(SEAL)
Attest:

Edward M. Fletcher, Jr.
Attesting Officer

WILLIAM E. SCHUYLER, JR.
Commissioner of Patents